United States Patent
Hakim

(10) Patent No.: US 8,988,660 B2
(45) Date of Patent: Mar. 24, 2015

(54) OPTICAL DETECTOR

(75) Inventor: Christophe Jean Erez Hakim, Mountain View, CA (US)

(73) Assignee: Silicon Laboratories Inc., Austin, TX (US)

( * ) Notice: Subject to any disclaimer, the term of this patent is extended or adjusted under 35 U.S.C. 154(b) by 696 days.

(21) Appl. No.: 13/172,031

(22) Filed: Jun. 29, 2011

(65) Prior Publication Data

US 2013/0004157 A1 Jan. 3, 2013

(51) Int. Cl.
*H04B 10/40* (2013.01)
*G01S 17/08* (2006.01)
*G01S 7/497* (2006.01)

(52) U.S. Cl.
CPC .............. *H04B 10/40* (2013.01); *G01S 17/08* (2013.01); *G01S 7/497* (2013.01)
USPC ..................................... 356/4.07

(58) Field of Classification Search
USPC ............................. 356/4.06, 4.07
See application file for complete search history.

(56) References Cited

U.S. PATENT DOCUMENTS

| | | | | |
|---|---|---|---|---|
| 3,815,994 A | * | 6/1974 | Peckham | 356/4.06 |
| 3,899,251 A | * | 8/1975 | Frenk et al. | 356/28 |
| 3,937,574 A | * | 2/1976 | Peckham et al. | 356/4.06 |
| 4,017,193 A | * | 4/1977 | Loiterman | 356/435 |
| 4,226,533 A | | 10/1980 | Snowman | |
| 4,752,799 A | * | 6/1988 | Stauffer | 396/109 |
| 4,853,532 A | * | 8/1989 | Stauffer | 250/221 |
| 5,070,483 A | * | 12/1991 | Berni | 367/14 |
| 5,229,829 A | * | 7/1993 | Nihei et al. | 356/4.06 |
| 5,451,931 A | | 9/1995 | Müller et al. | |
| 5,523,743 A | * | 6/1996 | Rattman et al. | 340/630 |
| 5,646,597 A | * | 7/1997 | Hamburger et al. | 340/627 |
| 5,751,830 A | * | 5/1998 | Hutchinson | 382/103 |
| 6,218,950 B1 | * | 4/2001 | Politze et al. | 340/630 |
| 6,225,910 B1 | * | 5/2001 | Kadwell et al. | 340/630 |
| 6,307,622 B1 | * | 10/2001 | Lewis | 356/4.01 |
| 6,326,897 B2 | * | 12/2001 | Kadwell et al. | 340/630 |
| 6,653,942 B2 | * | 11/2003 | Kadwell et al. | 340/630 |
| 6,803,593 B2 | * | 10/2004 | Ohishi et al. | 250/559.29 |
| 6,876,305 B2 | * | 4/2005 | Kadwell et al. | 340/630 |
| 7,382,441 B2 | * | 6/2008 | Kawai et al. | 356/4.01 |
| 7,623,222 B2 | * | 11/2009 | Benz et al. | 356/5.09 |
| 7,825,370 B2 | * | 11/2010 | Ikhlef et al. | 250/252.1 |
| 8,531,651 B2 | * | 9/2013 | Sato et al. | 356/4.07 |
| 2004/0085526 A1 | * | 5/2004 | Gogolla et al. | 356/4.01 |
| 2011/0181861 A1 | * | 7/2011 | Ritter et al. | 356/3 |
| 2013/0169947 A1 | * | 7/2013 | Hakim et al. | 356/3.1 |

* cited by examiner

*Primary Examiner* — Ari M Diacou
(74) *Attorney, Agent, or Firm* — Trop, Pruner & Hu, P.C.

(57) ABSTRACT

A technique includes using an emitter of an optical detector to emit a first optical signal and a receiver to acquire measurement of a second optical signal generated due to interaction of the first optical signal with a target. The technique includes scaling the acquired measurement based on a measure of optical crosstalk communication between the emitter and the receiver.

14 Claims, 4 Drawing Sheets

OPTICAL DETECTOR

BACKGROUND

This disclosure generally relates to an optical detector.

A proximity detector may be used to measure a distance to a given target. The measured distance, in turn, may be used for a number of different purposes such as industrial automation, consumer electronics, security panels, etc. A typical optical proximity detector includes an emitter, such as a light emitting diode (LED), which emits an optical signal that reflects from the target to produce a corresponding reflected optical signal. The reflected optical signal, in turn, is detected by the proximity detector's receiver, such as a photodiode. In general, when the target is relatively large, as compared to the desired detection distance, the amount of light reflected from the target is inversely proportional to the square of the distance between the proximity detector and the target.

SUMMARY

In an example implementation, a technique includes using an emitter of an optical detector to emit a first optical signal and using a receiver of the optical detector to acquire a measurement of a second optical signal that is generated due to interaction of the first optical signal with a target. The technique includes scaling the acquired measurement based on a measure of optical crosstalk communication between the emitter and the receiver.

In another example implementation, an optical detector includes an emitter to generate a first optical signal and a receiver to acquire a measurement of a second optical signal generated due to interaction of the first optical signal with an object. A controller of the optical detector scales the acquired measurement based on a measure of optical crosstalk communication between the emitter and the receiver.

In yet another example implementation, an apparatus includes an integrated circuit that includes a controller, a driver and a receive path. The driver is adapted to generate a first electrical signal to cause an emitter to emit a first optical signal. The receive path is adapted to receive a second electrical signal that is indicative of an acquired measurement of a second optical signal that is related to the first optical signal. The controller is adapted to scale the acquired measurement based on a measure of optical crosstalk communication between the emitter and the receiver.

Advantages and other desired features will become apparent from the following drawing, description and claims.

DETAILED DESCRIPTION

Figure 1:
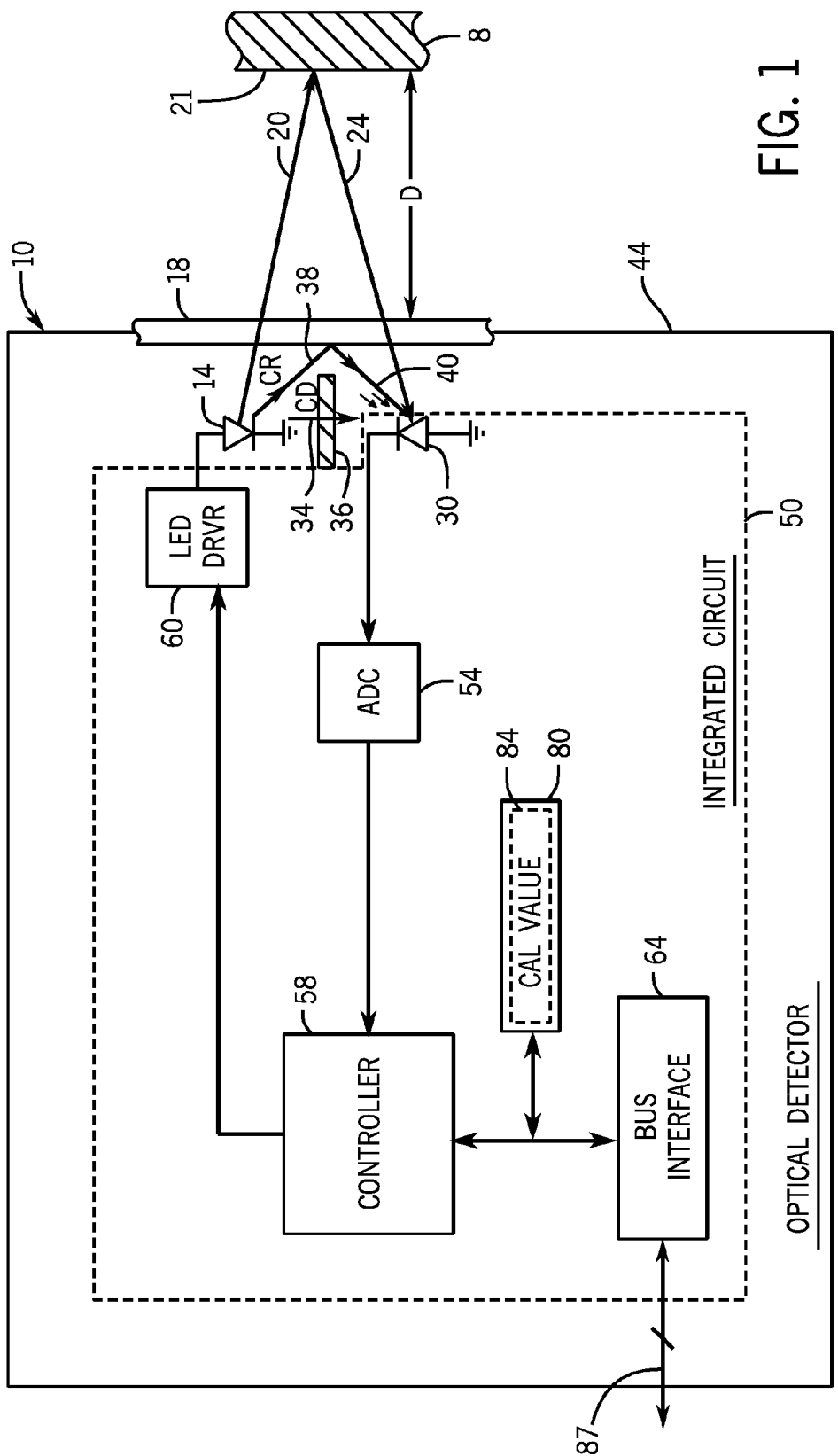
FIG. 1 is a schematic diagram of an optical detector according to an example implementation.

Referring to FIG. 1, in accordance with example implementations disclosed herein, an optical detector 10 generates and detects optical signals for purposes of acquiring a measurement that is indicative of an optical interaction with a target 8 of interest. As a non-limiting example, the optical detector 10 may be a proximity detector that measures at least one distance (an exemplary distance "D" being depicted in FIG. 1) between the optical detector 10 and the target 8 of interest. In this manner, the optical detector 10 generates an incident optical signal 20, which interacts with a surface 21 of the target 8 (reflects from the surface 21, for example) to produce a corresponding optical signal 24, which is measured by the optical detector 10 and is indicative of the distance D.

Alternatively, as another non-limiting example, the optical detector 10 may be a particle density detector that detects the particle density of the target 8. In this manner, for this example, the target 8 may be a fluid (gas or liquid) that has suspended particles. The optical signal 24 is indicative of the density of the particles that are suspended in the fluid and is the result of the interaction of the incident optical signal 20 with the fluid. In other words, the optical signal 24 is the result of the reflection of the optical signal 21 from the fluid and/or the partial obstruction of the optical signal 21 by the fluid. As a more specific non-limiting example, the optical detector 10 may be part of a smoke detector that detects the particle density of air that enters a sensing chamber, or cage, of the smoke detector. By sensing the particle density of the air within the cage, a determination may be made whether the chamber contains a concentration of smoke that is sufficient to trigger an alarm.

Thus, in general, the optical detector 10 may be used in numerous applications to measure an optical interaction with a target that may be a solid, a gas or a liquid.

As disclosed further herein, optical detector's measurement of the optical signal 24 contains a component that is attributable to the optical signal 24 and components that may be attributed to optical crosstalk between the detector's emitter and receiver. Moreover, the optical detector's sensing of these optical components is influenced by emitter efficiency variations, emitter driver variations and detector conversion-factor variations.

In accordance with example implementations, in general, the optical detector 10 includes at least one light emitting diode (LED) that the optical detector 10 controls to emit light to allow the optical detector's photodiodes(s) to acquire measurements that are indicative of one or more distances to a particular target or the particle density of the target. In this manner, the optical detector 10 may be used to measure multiple distances to a given target for purposes of employing triangulation to determine a two dimensional or three dimensional location of the target. For purposes of simplifying the following discussion, it is assumed that the optical detector 10 includes a single LED 14 (a visible or infrared LED, for example) that generates an incident optical signal 20 that interacts with the target 8 to produce an optical signal 24 that is sensed by a single photodiode 30 of the optical detector 10. However, in accordance with other implementations, the optical detector 10 may include multiple LEDs 14 and/or multiple photodiodes 30 that the detector 10 uses to acquire multiple distance measurements or multiple measurements associated with a particle density of the target 8 (such as when the optical detector 10 is used in a smoke detector, for example). Thus, many variations are contemplated and are within the scope of the appended claims.

The light that is sensed by the photodiode 30 contains optical components, other than the light that is produced solely by the optical signal 24. First, the light contains ambient light, which is sensed by the optical detector 10 during times when measurements are not being made and is removed by the detector 10. For purposes of simplifying the following discussion, it is assumed that the ambient light has been compensated by the optical detector 10, and the acquired measurement discussed herein does not contain an ambient light component.

The photodiode 30 also senses light, which is attributable to optical crosstalk communication between the LED 14 and the photodiode 30. More specifically, the optical crosstalk communication includes a direct crosstalk component (also called the "direct crosstalk $C_D$" herein), which represents direct optical coupling (represented by optical path 34 in FIG. 1) between the LED 14 and the photodiode 30. In this manner, although the proximity or particle detector 10 may include an optical isolator, or blocker 36, to attenuate the direct optical crosstalk, the optical isolation may be imperfect, thereby giving rise to the direct crosstalk component $C_D$.

The optical crosstalk communication also contains an indirect crosstalk component (called the "$C_R$ component" herein), which occurs when light takes an indirect path between the LED 14 and the photodiode 30 by reflecting from, for example, surfaces of the optical detector 10, which may or may not be inherent to the proximity or particle density detection function. For the example that is depicted in FIG. 1, the indirect crosstalk component $C_R$ is shown as arising from optical communication between the LED 14 and the photodiode 30 due to light that propagates from the LED 14 along optical path 38 to a semi-transparent overlay or product cover, such as a window 18, where the light reflects to produce light that propagates along optical path 40 to the photodiode 30.

As a result of the above-described direct and indirect optical crosstalk communication, the actual optical signal that is measured by the photodiode 30 is a summation of three components: "$R+C_D+C_R$," where "R" represents the component that is attributable solely to the optical signal 24.

The R, $C_D$ and $C_R$ components that are sensed by the optical detector 10 are influenced by several characteristics of the optical detector 10, which vary from one optical detector 10 to the next; and these variations make it challenging to remove the combined $C_D+C_R$ component. For example, the optical detector's emitter efficiency influences the measurement of these components, and the emitter efficiency varies from one optical detector to the next, due to manufacturing tolerances; temperature drift; component aging; and the long-term accumulation of dirt, dust or other contaminants able to modify the received optical signal. Additionally, the circuitry of the optical detector 10, which drives the emitter may introduce errors that are unknown or may not be controlled precisely, due to manufacturing variations, temperature drift and component aging. Moreover, the conversion of the detected optical signal from optical power to an intelligible analog or digital electrical signal may also vary with the manufacturing tolerances, temperature drift and component aging.

One way to process the signal measured by the photodiode 30 to generate a signal that is indicative of the optical component R is to 1.) subtract a baseline component formed from the combined $C_D$ and $C_R$ components from the signal that is measured at the photodiode and 30 and 2.) compare this difference to a predetermined distance or particle density threshold, as described below:

$$(R+Cd+Cr)-(Cd+Cr) > \text{(Threshold 1), or} \qquad \text{Eq. 1}$$

$$(R+Cd+Cr)-(Cd+Cr) < \text{(Threshold 1),} \qquad \text{Eq. 2}$$

depending on the application's requirements, and where "Threshold 1" represents a detection threshold. In this manner, either Eq. 1 or Eq. 2 is applicable, depending on whether the optical detector is employed in an optically reflective application or in an optically obstructive application. However, the R, $C_R$ and $C_D$ components, as sensed by the optical detector, vary from one optical detector to the next, due to component aging; manufacturing tolerances; temperature drift; temperature drift; component aging; long-term accumulation of dirt, dust or other contaminants able to modify the received optical signal; etc. Although Threshold 1 may be calculated in a manner that attempts to take these variations into account, in a high volume manufacturing environment, precisely determining the Threshold 1 may be prohibitive. In this manner, determining the Threshold 1 relies on precisely tracking error factors for all of the individual components that make up the optical detector. Although variations in these error factors may be limited somewhat through the use of relatively high precision components, such high precision components may be unavailable or available at relatively high cost premiums.

Instead of the above-described approach to generate an indication of the optical component R, in accordance with implementations described herein, the optical detector 10 generates an indication (e.g., an analog or digital signal) of the optical component R by comparing a ratio of the measured optical signal (R+Cd+Cr) to the baseline component ($C_D+C_R$), as set forth below:

$$(R+Cd+Cr)/(Cd+Cr) > \text{Threshold 2, or} \qquad \text{Eq. 3}$$

$$(R+Cd+Cr)/(Cd+Cr) < \text{Threshold 2,} \qquad \text{Eq. 4}$$

depending on the application's requirements, and where "Threshold 2" represents a detection threshold. In other words, the optical detector 10 scales the acquired measurement based on a measure of optical crosstalk communication.

Thus, a baseline formed from the $C_D$ and $C_R$ components may be used as a calibration variable to compensate the acquired optical measurement. Because all three of the R, $C_D$ and $C_R$ components vary proportionally with such factors as aging, manufacturing tolerances and temperature drift, the ratio that is set forth in each of Eqs. 3 and 4 cancels out the variations, the corresponding threshold (Threshold 2) is not adjusted for these variations, and the optical detector 10 therefore generates a more precise indication of the distance D to the target 8 of the particle density of the target 8.

Figure 2:
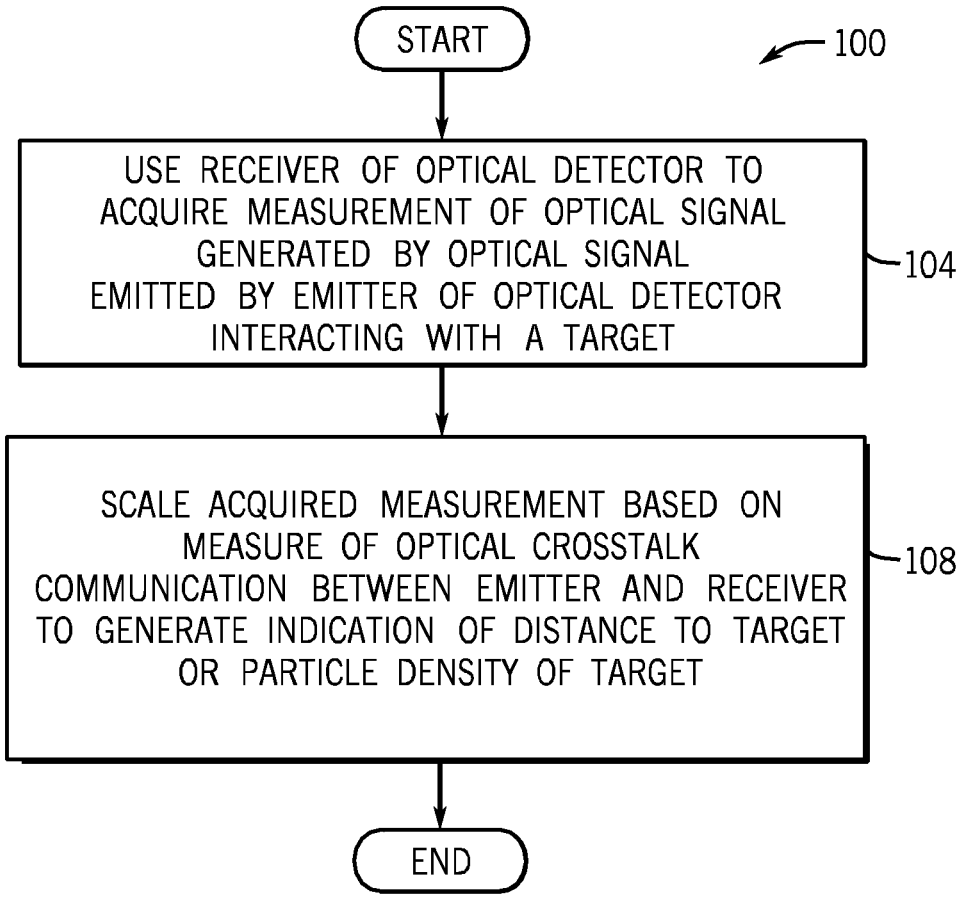
FIGS. 2 and 3 are flow diagrams depicting techniques to measure a distance to a target or a particle density of the target using the optical detector according to example implementations.

Referring to FIG. 2, thus, in accordance with exemplary implementations, a technique 100 includes using (block 104) a receiver of an optical detector to acquire a measurement of an optical signal that generated by the interaction of an optical signal emitted by an emitter of the optical detector with a target. The technique 100 includes scaling (inversely scaling, for example) the acquired measurement based on a measure of the optical crosstalk communication between the emitter and the receiver to generate an indication of a distance to the target or a particle density of the target, pursuant to block 108.

Figure 3:
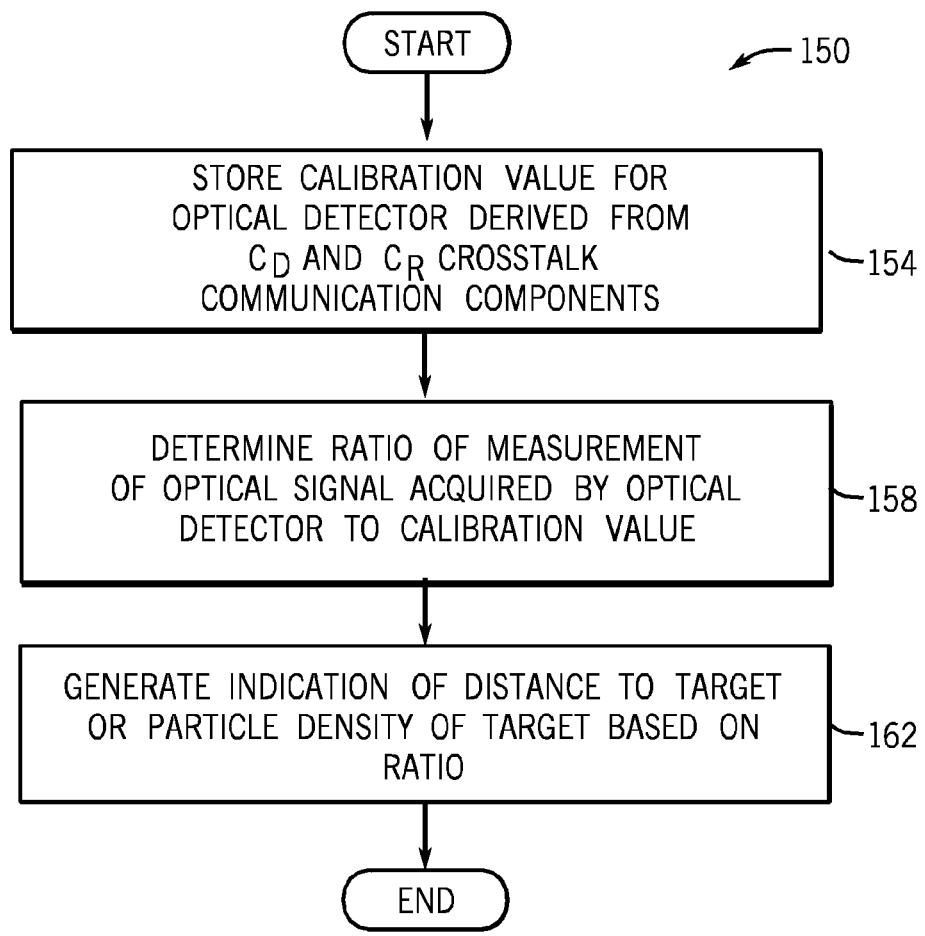

As a more specific example, a technique 150 that is depicted in FIG. 3 includes storing (block 154) a calibration value for an optical detector derived from the $C_D$ and $C_R$ crosstalk components for the optical detector and determining (block 158) a ratio of a measurement of an optical signal due to interaction of an incident optical signal with a target and acquired by a optical detector to the calibration value. It is noted that the calibration value may be determined by the manufacturer of the optical detector 10, determined by a manufacturer that incorporates the optical detector 10 into a product, etc., depending on the particular implementation. Pursuant to the technique 150, an indication of the distance D to the target or the particle density of the target is generated based on this ratio, pursuant to block 162.

Referring back to FIG. 1, the optical detector 10 may have one of many different architectures, depending on the particular implementation. As a non-limiting example, in accordance with an exemplary implementation, the optical detector 10 includes a housing 44, which contains the LED 14, the photodiode 30 and contains the window 18 for purposes of emitting and receiving light associated with the functions of the optical detector 10. The window 18 may contain an optical filter that selects an infrared or visible band for the photodiode 30, or alternatively, the optical filter may be placed over the photodiode 30. As another example, an optical filter may be placed over the photodiode 30, and another optical filter may be part of the window 18.

The optical detector 10 may include an integrated circuit 50, which contains various components to control the LED 14 for purposes of emitting light for the distance or particle density measurement as well as measure a signal produced by the photodiode 30 when measuring the optical signal 24. To this end, the integrated circuit 50 may include, for example, the photodiode 30 and a receive path that includes an analog-to-digital converter (ADC) 54. The ADC 54 is coupled to the photodiode 30 for purposes of receiving an analog signal. The ADC 54 generates a digital signal that is indicative of the analog signal, and this digital signal is received a controller 58 of the integrated circuit 50.

In general, the controller 58, which may contain a microprocessor or be formed from hardwired or field-programmable circuitry, processes the digital signal that is provided by the ADC 54 to determine a ratio of the corresponding acquired optical signal measurement (R) to a baseline component ($C_D+C_R$), which may be indicated by a calibration value 84 that is stored in a register 80, for example. It is noted that the calibration value 84 may be programmed by the manufacturer of the integrated circuit 50, may be programmed by the manufacturer of the optical detector 10, may be programmed by a system manufacturer that incorporates the optical detector 10 into a product, etc., depending on the particular implementation.

Among its other features, in accordance with some exemplary implementations, the integrated circuit 50 may include an LED driver 60 for purposes of controlling the emission of optical energy by regulating the operation of the LED 14 in response to a signal from the controller 58. Moreover, as shown in FIG. 1, in accordance with some exemplary implementations, the controller 58 may communicate with an external bus (an SMP or I²C bus 87, as non-limiting examples) via a bus interface 64. In this manner, in accordance with some implementations, the bus interface 64 may be programmed via external circuitry for purposes of programming the measurements to be conducted by the optical detector 10; programming the calibration value 84; retrieving data indicative of the determined distance or particle density, calculated pursuant to Eq. 3 or 4 from the optical detector 10; etc.

Other variations are contemplated and are within the scope of the appended claims. For example, in some implementations, the photodiode 30 may not be part of the integrated circuit 50. As another example, in accordance with other implementations, the optical detector 10 may use a plurality of LEDs 14, for purposes of establishing a triangulated system that measures at least two distances with respect to the optical detector 10 such that a two-dimensional relationship of the target with respect to the optical detector 10 may be determined.

Figure 4:
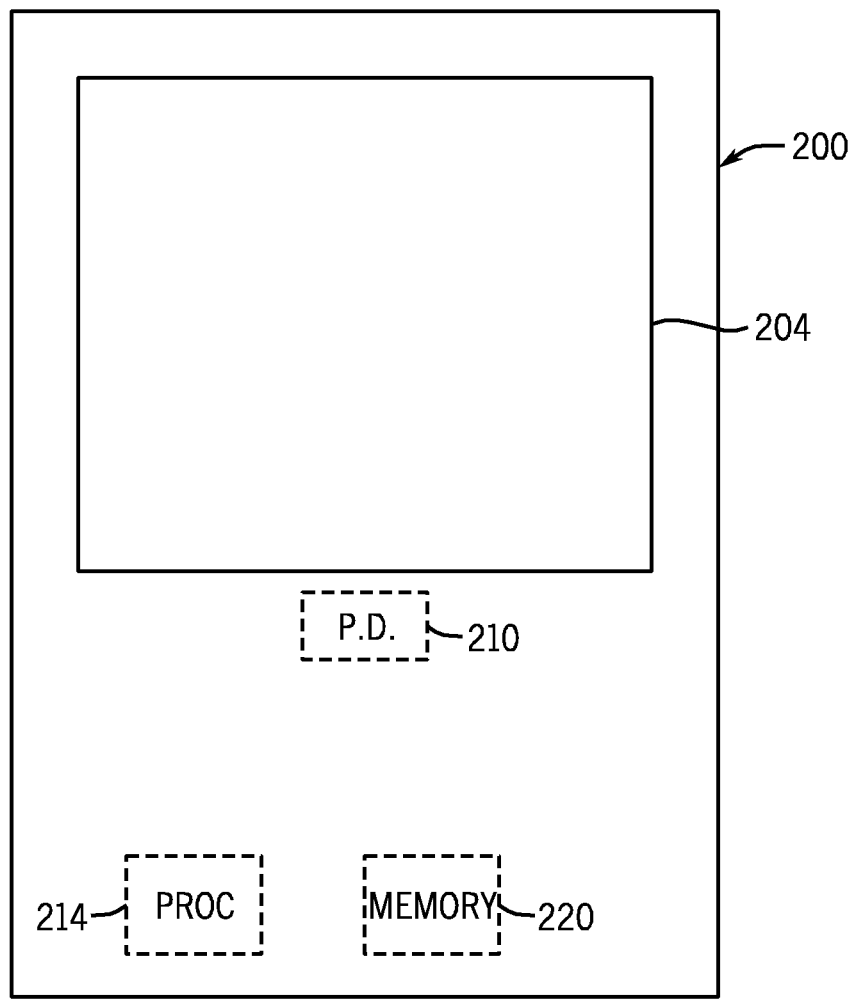
FIG. 4 is an illustration of a portable electronic device according to an example implementation.

Such a relationship may be useful, for example, for a portable electronic device 200 that is depicted in FIG. 4. In this regard, in accordance with an example implementation, the portable electronic device 200 (a tablet, a cellular telephone, a smart phone, a book reader, etc.) may employ a proximity detector 210 that has a similar design to the optical detector 10 for purposes of allowing a user to interact with the device 200. In general, the proximity detector 210, regardless of the number of emitters and receivers, employs techniques described herein, such as techniques 100 and 150, for purposes of generating an indication of at least one distance between a target and the detector 210. For example, in an exemplary implementation, the proximity detector 210 may store optical crosstalk calibration values and use the calibration values as described herein to generate indications of at least two distances such that a two dimensional screen location of a stylus or a user's finger with respect to a screen 204 of the electronics device 200 may be tracked for purposes of allowing a user to make selections and input data. As shown in FIG. 4, the electronic device 200 may be a processor-based machine, which contains at least one processor 214 (one or more central processing units (CPUs) or microcontrollers), a non-transitory storage memory 220 (a semiconductor memory, for example), etc.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
using an emitter of an optical detector to emit a first optical signal and a receiver of the detector acquire a measurement of a second optical signal generated due to interaction of the first optical signal with a target;
scaling the acquired measurement based on a measure of optical crosstalk communication between the emitter and the receiver, wherein:
the measure of optical crosstalk communication comprises at least one of a measure of direct crosstalk communication between the emitter and the receiver and a measure of indirect and direct crosstalk communication between the emitter and the receiver, and
the scaling comprising determining a ratio of the acquired measurement to a calibration value indicative of the optical crosstalk communication; and
determining an indication of a distance between the optical detector and the target based at least in part on the ratio.

2. The method of claim 1, wherein:
the object comprises at least one reflective surface to generate the second optical signal, the second optical signal being indicative of a distance to the object.

3. The method of claim 1, further comprising using the scaling of the acquired measurement to generate an indication of a distance between the optical detector and the target.

4. The method of claim 1, further comprising comparing the ratio to a threshold to generate the indication of the distance.

5. The method of claim 4, further comprising generating a signal indicative the distance.

6. The method of claim 1, wherein the scaling comprises reducing the acquired measurement proportionally to the measure of the optical crosstalk communication.

7. The method of claim 1, further comprising storing a calibration value in the detector indicative of the measure of the crosstalk communication and performing the scaling based on the calibration value.

8. An optical detector comprising:
an emitter to generate a first optical signal;

a receiver to acquire a measurement of a second optical signal generated due to interaction of the first optical signal with an object; and a controller adapted to scale the acquired measurement based to a calibration value indicative of a measure of optical crosstalk communication between the emitter and the receiver and determine an indication of a distance between the optical detector and the target based at least in part on the ratio, wherein the measure of optical crosstalk communication comprises at least one or a measure of direct crosstalk communication between the emitter and the receive and a measure of indirect and direct crosstalk communication between the emitter and the receiver.

9. The optical detector of claim 8, wherein the controller is further adapted to compare the ratio to a threshold and generate the indication of the distance based at least in part on the comparison.

10. An apparatus comprising:

an integrated circuit comprising a controller, a driver adapted to generate a first electrical signal to cause an emitter to emit a first optical signal and a receive path to receive a second electrical signal that is indicative of a measurement of a second optical signal that is related to the first optical signal;

wherein the controller is adapted to determine a ratio of the acquired measurement on a calibration value indicative of a measure of optical crosstalk communication between the emitter and the receiver and determine an indication of a distance between the optical detector and the target based at least in part on the ratio; and wherein the measure of optical crosstalk communication comprises at least one of a measure of direct crosstalk communication between the emitter and the receiver and a measure of indirect and direct crosstalk communication between the emitter and the receiver.

11. The apparatus of claim 10, wherein:

the first optical signal interacts with at least one reflective surface of an object to generate the second optical signal, and the second optical signal is indicative of a distance to the object.

12. The apparatus of claim 11, wherein the controller is adapted to reduce the acquired measurement proportionally to the measure of the crosstalk communication to generate an indication of the distance.

13. The apparatus of claim 10, wherein the controller is further adapted to store a calibration value.

14. The apparatus of claim 10, wherein the controller is further adapted to compare the ratio to a threshold and generate the indication of the distance based at least in part on the comparison.

* * * * *

UNITED STATES PATENT AND TRADEMARK OFFICE
CERTIFICATE OF CORRECTION

| | | |
|---|---|---|
| PATENT NO. | : 8,988,660 B2 | Page 1 of 1 |
| APPLICATION NO. | : 13/172031 | |
| DATED | : March 24, 2015 | |
| INVENTOR(S) | : Christophe Jean Erez Hakim | |

It is certified that error appears in the above-identified patent and that said Letters Patent is hereby corrected as shown below:

In the Claims

Column 7:
Line 4, delete "scale" and insert --determine a ratio of--;
Line 5, delete "based";
Line 10, delete "or" and insert --of--; and
Line 12, delete "receive" and insert --receiver--.

Signed and Sealed this
Seventh Day of July, 2015

Michelle K. Lee
*Director of the United States Patent and Trademark Office*